Jan. 19, 1965  J. A. GAYLORD  3,165,763
SAFETY LOCKING DEVICE FOR THE INFLATING
MEANS IN AERIAL SURVIVAL KITS
Filed Jan. 15, 1963  5 Sheets-Sheet 1

Fig.1.

INVENTOR.
JOHN A. GAYLORD
BY George B White
ATTORNEY

Jan. 19, 1965  J. A. GAYLORD  3,165,763
SAFETY LOCKING DEVICE FOR THE INFLATING
MEANS IN AERIAL SURVIVAL KITS
Filed Jan. 15, 1963  5 Sheets-Sheet 4

INVENTOR.
JOHN A. GAYLORD
BY George B. White
ATTORNEY

United States Patent Office 3,165,763
Patented Jan. 19, 1965

3,165,763
SAFETY LOCKING DEVICE FOR THE INFLATING
MEANS IN AERIAL SURVIVAL KITS
John A. Gaylord, San Rafael, Calif., assignor to H. Koch
& Sons, Corte Madera, Calif., a partnership
Filed Jan. 15, 1963, Ser. No. 251,647
12 Claims. (Cl. 9—11)

This invention relates to safety locking device for the inflating means of aerial survival kits.

In aerial survival kits of the type described in my co-pending application Serial No. 34,104 filed on June 6, 1960, now Patent No. 3,107,370, serious accidents happened by reason of the accidental actuation of the raft inflating means so that the raft inflated in the kit before the kit was opened. In order to avoid repetition of such accidents it became vital to solve the problem of supporting the container for the inflating medium so as to prevent accidental dislodging and also to positively prevent the actuating lines for the valve of such container to be accidentally or prematurely operated. In such structures the container, usually a bottle, is controlled by a valve which latter is actuated by a line connected to a manipulating device on the outside of survival kit, which manipulating device usually actuates also several other devices simultaneously. Consequently, the problem involved is the prevention of the relative movement of the bottle containing $CO_2$ or other inflating gas so it would not pull on the lines, and also the provision of a safety device to prevent the pulling of the line prematurely.

The primary object of the invention is to provide a safety device for the firmly held bottle containing the inflating gas which is interconnected between the actuating line and the valve on the container or bottle for the inflating medium in such a manner that accidental actuation and opening of the valve is positively prevented.

Another object of the invention is to provide a safety device in an aerial survival kit for holding firmly a removable inflating medium container in the kit against accidental dislodgmeent and to lock the inflating valve of said container until the raft is freed from the kit and then to release said valve for opening said inflating valve and freeing said container from the kit.

Another object of the invention is to provide a safety device in an aerial survival kit which firmly holds the container for the inflating medium connected to a raft in the kit, and which positively locks the inflating valve controlling the flow of said medium to said raft, and which device is releasable when the kit is released so as to free the raft and said container together and open said valve for inflating the raft only when freed from said container and means being provided to prevent accidental opening of said valve or dislodging of said container in the kit.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein.

The aerial survival kit herein shown includes a rigid case 1 and a rigid lid 2 fitting over the case 1 and being locked in place by interengaging releasable locking elements 3 described in said co-pending application.

In the case 1 is folded an inflatable raft 4 connected to a lanyard 6, which latter in turn is connected to a bridle 7 secured to the case 1 at one end, and through the lid 2 to a suitable parachute suspension not shown, so that when released the raft 4 is suspended free and spaced from the case 1, and its inflation in the air is not at all hindered or restrained.

The container for the inflating medium in this illustration is a $CO_2$ bottle 8, to the neck 9 of which is secured a loop 11 of the lanyard 6. A sleeve 12 secured to the raft 4 is tightly held on the bottle 8 so that the bottle 8 and the raft 4 are released and suspended on the lanyard 6 together.

On the neck 9 of the bottle 8 is threaded a valve casing 13, an outlet 14 of which is connected by a suitable fixed conduit 16 to a suitable intake of the raft 4. In the valve casing 13 is a suitable valve which is closed and opened by moving a valve stem 17 which slidably extends through a cap 18 threaded on the free end of the valve casing 13. In the herein illustration a valve disk 19 is pulled against a valve seat 21 across said valve casing 13 by pulling the valve stem 17 outwardly of the valve casing 13 thereby to close the valve. By moving the valve stem 17 inwardly of the valve casing 13 the valve disk 19 is pushed away from the valve seat 21 and thus the valve is opened. A tail stem 22 extends from the valve disk 19 into the valve casing 13 and terminates in a perforated abutment disk 23. A coil spring 24 of larger diameter than the valve disk 19 is located between the valve seat 21 and the abutment disk 23 so as to urge the valve disk 19 away from the valve seat 21 thereby to open the valve.

The valve is kept closed by a wedge cam device 26 connected to the valve stem 17 in such a manner that the valve is held initially closed and is opened by turning the wedge cam device so as to release or move the valve stem 17 into valve opening position. In the present illustration the wedging action is augmented by the pull of the coil spring 24, the wedge cam device being so connected to the stem that said coil spring pulls the wedge tighter.

Figure 1:
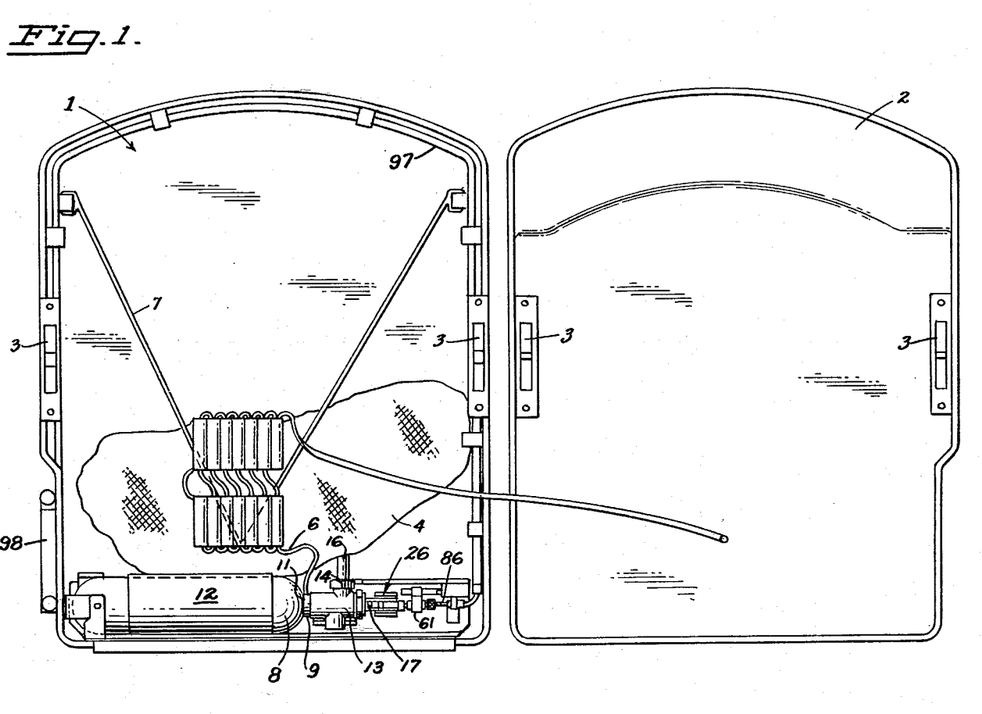
FIG. 1 is a plan view of a safety kit case and its cover open showing the arrangement of the raft and the inflating bottle, valve control, and actuating mechanism in the case of the kit.
Figure 2:
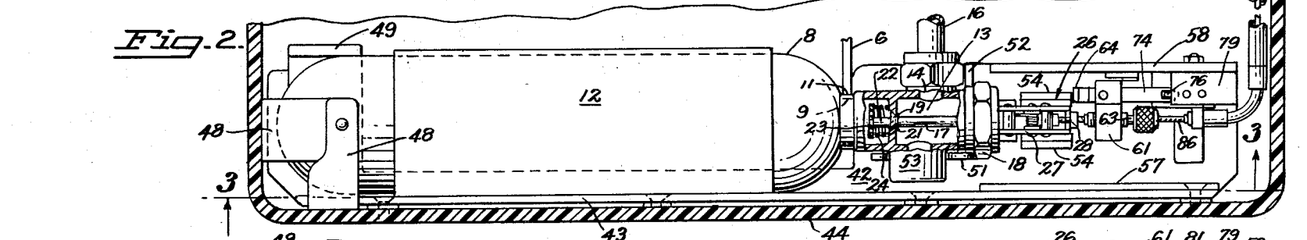
FIG. 2 is a fragmental plan view of the case partly in section showing the mounting of the bottle, on an enlarged scale.
Figure 3:
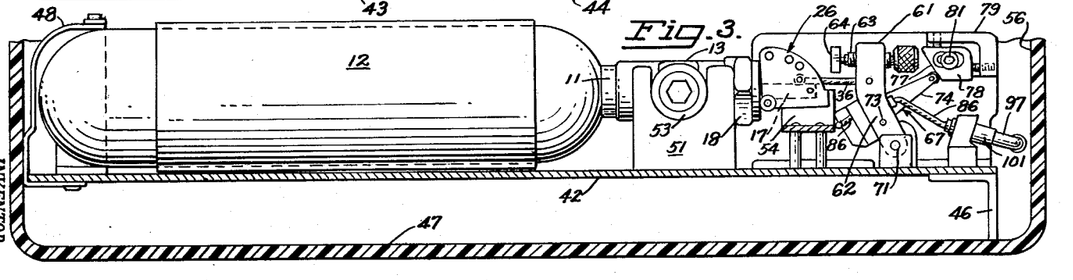
FIG. 3 is a sectional side view, the case being shown in section taken on lines 3—3 of FIG. 2.
Figure 4:
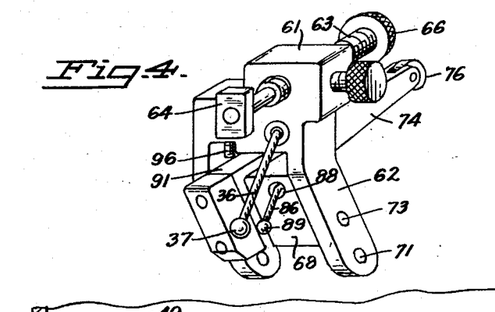
FIG. 4 is a perspective front view of the valve locking and actuating lever head on an enlarged scale.
Figure 5:
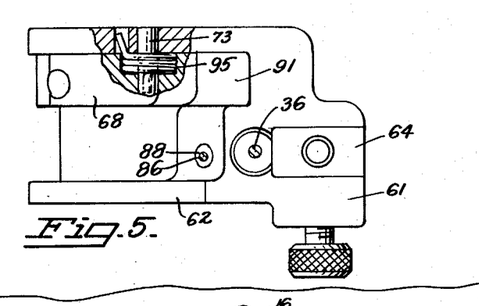
FIG. 5 is a top plan view on an enlarged scale of the valve locking and actuating head.
Figure 6:
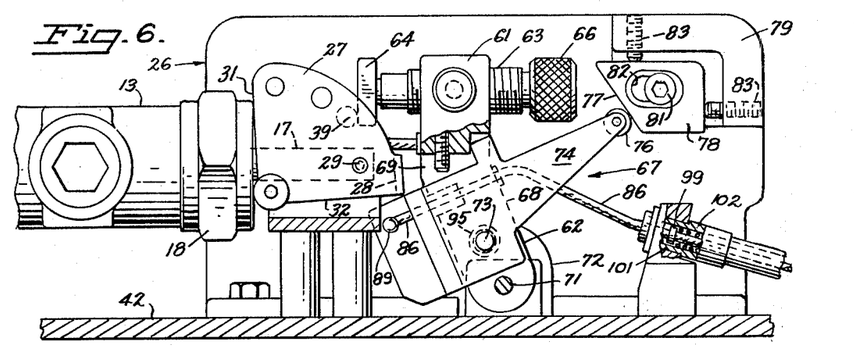
FIG. 6 is a fragmental partly sectional side view on an enlarged scale showing the valve locking and actuating head in valve locking position.
Figure 8:
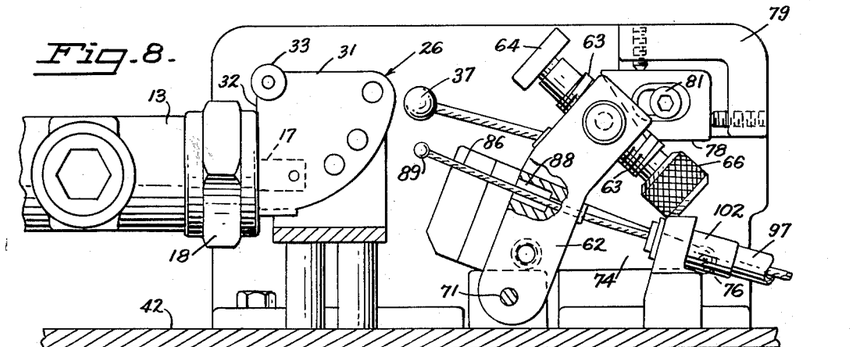
FIG. 8 is the same kind of view as in FIG. 7, showing the locking device released and the valve actuated.
Figure 9:
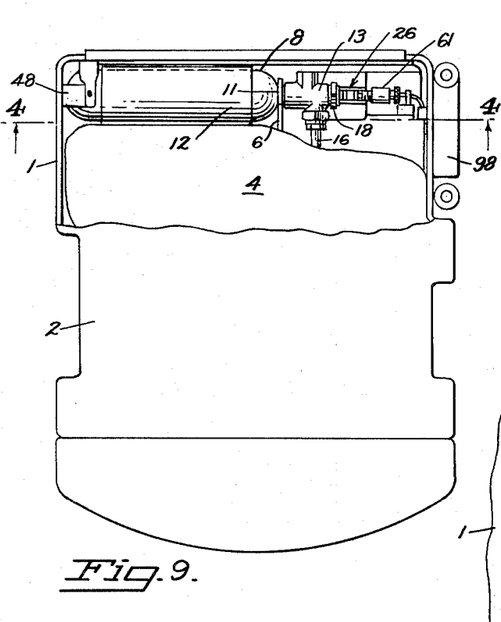
FIG. 9 is a plan view of the kit closed, the lid being partly broken away to show the arrangement of a modified mounting of the bottle for the inflating medium.
Figure 10:
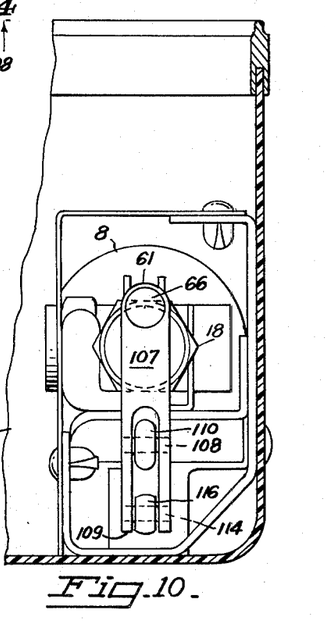
FIG. 10 is a fragmental view of the casing showing an end view of the bottle mounting.

The wedge cam device 26 includes spaced plates 27 connected by a cross piece 28 so as to straddle the end of the valve stem 17. A pivot pin 29 extends through the valve stem 17 near its outer end and through the plates 27 and pivotally connects the plates 27 to the valve stem 17. The stem pivot is near the outer connecting cross piece 28. The bearing edges 31 of the yoke plates 27 are spaced from the pivot pin 29 at a distance substantially corresponding to the closed position of the valve disk 19 on the valve seat 21. The pivot pin 29 is located near the side edges 32 at right angles to the bearing edges 31. In the corners formed by said bearing edges 31 and right angle side edges 32 are journalled pairs of rollers 33 which latter extend slightly beyond said edges so as to ride on the end face 34 of the cap 18. When these corners or rollers 33 are offset beyond the line of the center of the pivot pin 29, as shown in FIG. 6, the pull of the coil spring 24 exerted through the pivot pin 29 on the plates 27 wedges the plates 27 between the pivot pin 29 and the end face 34 of the cap 18. In order to open the valve a pull is exerted on the plates 27 on the side of the pivot pin 29 opposite from said roller 33 so as to create a turning moment about said pivot pin 29 in clockwise direction viewing FIG. 6, thereby to move the rollers 33 along said end face 34 past the center of the pivot pin 29 and thereby to shift the position of the pivot pin 29 and the valve stem 17 toward the valve casing 13, to the position shown in FIG. 8, where the right angle side edge 32 bears against the end face 34 and the valve is opened.

Such pull and turning moment is exerted on the plates 27 by means of a pull line 36 extended along the valve stem 17, and by a ball 37. A catch pawl 38 is journalled on a cross pin 39 between the plates 27. A coil spring 41 on the cross pin 39 is anchored so as to urge the pawl 38 toward the stem 17. The spacing between the stem 17 and the pawl 38 is less than the diameter of the pull ball 37, which latter is between the pawl 38 and the end face 34. Thus the pulling of the pull ball 37 is converted through the pawl 38 and its cross pin 39 into the turning moment required to turn the plates as heretofore described.

For preventing accidental dislodging of the $CO_2$ bottle 8 or the accidental opening of the inflating valve, there is provided a special nest to support and hold the bottle 8, and a special locking device releasable only upon positive actuation of other devices to free the raft 4 from the case 1.

The nest includes a base 42, a vertical flange 43 of which is suitably fastened to the adjacent side wall 44 of the case 1. Suitable spacer legs 46 space the base 42 from the bottom 47 of the case 1.

At one end of the base 42 are provided interconnected curved strips 48 at right angles to one another to embrace a side and the top of the end of the bottle 8. A restraining flange 49 extended upwardly from the base 42 retains the other side of the end of the bottle 8.

Near the valve of the bottle 8 are formed a pair of upwardly extended open yokes 51 and 52 respectively to nest a valve projection 53 and the valve cap 18. Thus both ends of the bottle 8 are restrained from shifting in the case 1.

The wedge cam 26 is nested between flanges 54 so as to be held aligned with the locking device located in the space between the wedge cam 26 and the adjacent end of the base 42 or the adjacent side 56 of the case 1. This space is also bordered by spaced side plates 57 and 58. The function of the locking device is to lock the valve against accidental opening, and to connect the valve to the actuator line of the kit so as to release the valve and to open it when the actuator line is properly manipulated.

The locking device in the herein illustration also locks the bottle 8 in position by pressing it into the cage formed by the curved bars 48.

The locking device shown in FIGS. 1 to 8 inclusive includes an abutment end 61 on a pivoted lever 62 swingable toward the lower cross pin 39. In the abutment end 61 is threaded a screw 63 which has an abutment head 64 on its end fitting in the space between the wedge plates 27 and bearing against the cross pin 39. The screw 63 has a suitable head such as a knurled head 66 on its other end for preadjusting the stroke of the abutment end 61.

A releasable lock and pull line connection 67 holds the lever 62 in valve locking position. This releasable lock and connection 67 includes a block 68 in a recess 69 in the lever 62 between the lever pivot 71 and the abutment end 61. The lever pivot 71 is on the lower end of the lever 61 viewing FIG. 6 and is journalled in bearing lugs 72 on the base 42. The block 68 is journalled on a pivot pin 73 parallel with the axis of the lever pivot 71, but spaced above it, so that the block 68 turns on a shorter radius than the lever 62 and turns eccentrically relatively to the lever pivot 71. From the block 68 extends a finger 74. The outer end or tip of the finger 74 has a roller 76 journalled therein, which roller 76 abuts against and rides on an inclined keeper wall 77 of a keeper block 78. The inclined keeper wall 77 is tangential to the circular path of the roller movement about the axis of the block pivot pin 73. Thus when the pull block 68 is turned about the axis of its pivot pin 73 the roller 76 rides off the inclined keeper wall 77 and allows the pulling of the lever 62 about the lever pivot 71 away from the bottle valve. But any turning force exerted on the lever 62, without first pulling the pull block 68 out of the lever 62, is resisted by the abutment of the roller 76 against the inclined keeper wall 77. In this manner the lever 62 is held in valve and bottle locking position positively until the pull block 68 is pulled to release the roller 76 from the keeper wall 77.

The keeper block 78 is held in a bracket 79 on the side plate 58 by a suitable bolt 81 extended through an enlarged hole 82 to permit adjustment of the keeper block position.

Set screws 83 in the top of the bracket and in the end wall of the bracket abutting against the respective sides of the keeper block 78 facilitate fine adjustment of the position of the inclined keeper wall 77 relatively to the finger 74.

The valve opening pull line is suitably anchored in the lever 62 below the abutment end 61, so that the ball 37 on the pull line 36 can be suitably located in the wedge cam device 26 as heretofore described.

Figure 7:
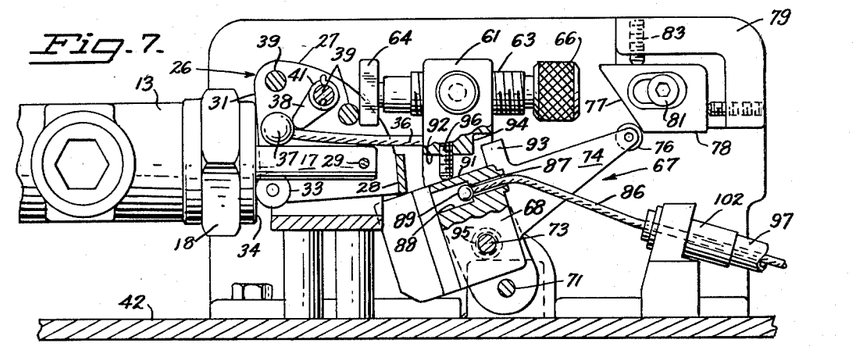
FIG. 7 is the same kind of view as shown in FIG. 6, showing the play of the pull line taken up.

The pull block 68 is pulled by a suitable actuating line 86 which extends through a passage 87 and into a pocket 88 in said block 68. A ball 89 on the end of the actuating line 86 fits in the pocket 88 so as to transmit pull from said actuating line 86 to the block 68. When the actuating line 86 is pulled, the ball 89 engages the bottom of the pocket 88 and pulls the block 68 out of the recess 69 around the block pivot pin 73, thereby freeing the finger roller 76 from the keeper wall 77. Initially, as shown in FIG. 6, the pull block 68 is positioned generally parallel with the body of the lever 62, so that the top 91 of the pull block 68 is spaced from the top wall 92 of the recess 69. A prong 93 extended from the block top 91 abuts against a shoulder 94 at the recess top wall 92 so as to brace the pull block 68 against the lever 62 and resist turning of the lever 62 into valve opening position. A coil spring 95 around the block pivot pin 73 normally urges the block 68 into such abutting position. A set screw 96 extended through the recess top wall 92 abuts against the block top 91, after the block 68 is turned to free the finger roller 76 as shown in FIG. 7. Further pull on the block 68 thereafter is transmitted to the lever 62 for turning the lever 62 from the position shown in FIG. 7 into the position shown in FIG. 8, thereby pulling the wedge cam device 26 and opening the valve and releasing the bottle 8 as heretofore described.

The actuating line 86 in this form extends through a suitable guide tube 97 around the inside of the case 1 to a manipulating device 98 on the outside of the case 1, which device is used in the manner shown, in my said copending application, for actuating also other lines for unlocking the lid and other devices in the kit simultaneously. To further protect against accidental release of the valve device, the actuating line 86 has a fixed washer 99 on it in a guide bushing 101, and a coil spring 102 between the washer 99 and the bottom of the bushing 101 urges the actuating line 86 into the pull block 68. The spacing of the washer 99 from the ball 89 is such that the ball 89 is held spaced from the bottom of the pocket 88, as shown in FIG. 6, thereby providing lost motion or play of the actuating line 86 before the pull is transmitted by the ball 89 to the pull block 68. Thus a limited short stroke pull on the actuating line 68 will not open the inflating valve.

Figure 11:
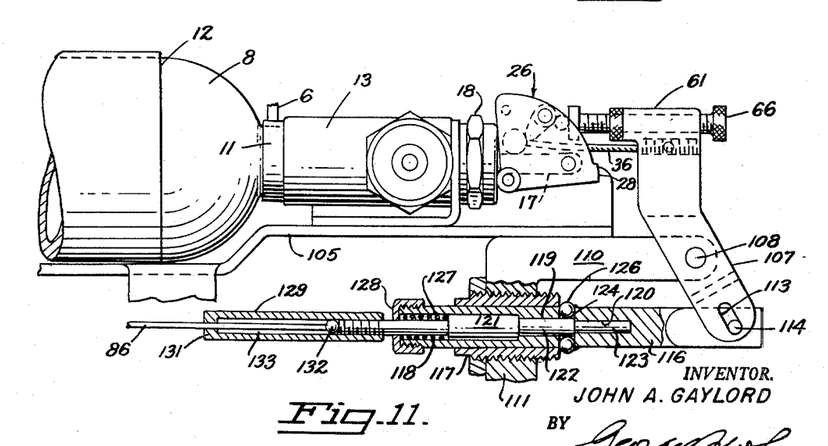
FIG. 11 is a partly sectional view on an enlarged scale of the modified form of valve locking and actuating lever and device.
Figures 12, 13, 14:
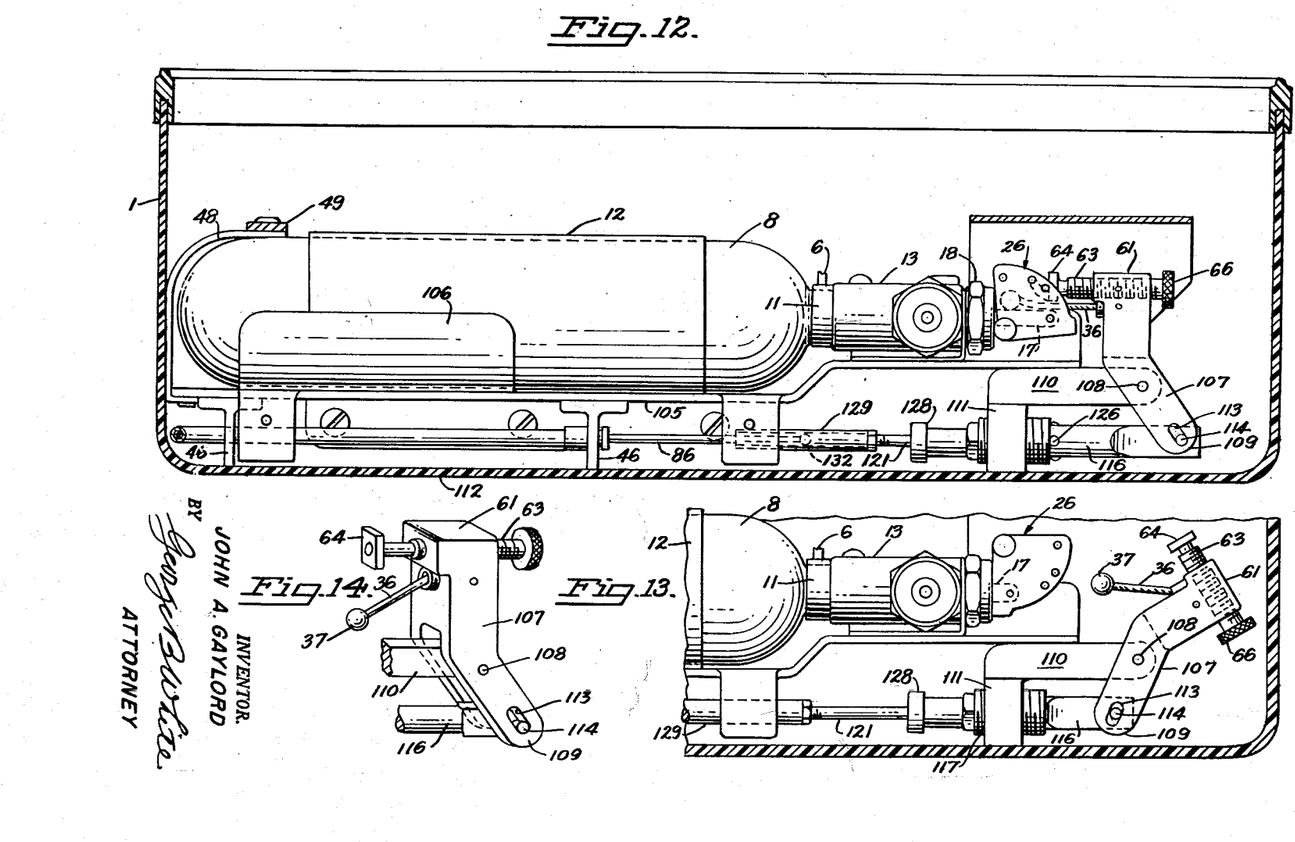
FIG. 12 is a sectional view of the case showing the modified mounting and locking of the bottle.
FIG. 13 is a fragmental view showing the locking lever released so as to open the inflating valve.
FIG. 14 is a perspective detail of the modified form of the lever and locking head.

In the modified form shown in FIGS. 9 to 14 inclusive, the $CO_2$ bottle 8 is connected to the raft 4 in the case 1 the same way as in the first described form. The contour of the base 105 for the bottle 8 is somewhat different from the first described form. This form also has a side shield 106 spaced from the case wall and conforming the curvature of the lower portion of the bottle 8, as shown in FIG. 12.

The abutment end 61 and screw 63 therein are arranged about the same way as in the first form, but the lever 107 of this form is pivoted on a pivot 108 spaced from its lower end 109. The pivot 108 is journalled in the end of an arm 110 of a bracket 111, suitably mounted on the bottom 112 of the case 1. The pull line 36 is anchored on the lever 107 near the abutment end 61.

The pivoted end of the lever 107 is bifurcated so as to straddle the bracket arm 110. In the bifurcated end of the lever 107 is an axially elongated slot 113 to accommodate a pulling pin 114 secured in a pulling bar 116, as shown in FIG. 11. The bar 116 slidably extends through a bushing 117 threaded into the vertical portion of the bracket 111. In the free end of the bar 116 is a recess or enlarged hole 118 through the bottom of which extends a reduced hole 119, from the bottom of which latter extends a still more reduced end hole 120. A pulling pin 121 is slidable in the enlarged hole 118. A reduced pin portion 122 is slidable through the reduced hole 118 and a still further reduced pin portion 123 is slidable into and out of the reduced end hole 120 as shown in FIG. 11.

Near the inner end of the middle reduced hole 119 and around its periphery are provided a plurality of sockets 124. A ball 126 is nested in each socket 124. The outer ends of the sockets 124 are peened over to limit the outward movement of the balls 126 but the inner portions of the sockets 124 open into the reduced hole 119 so as to allow the balls 126 to project into said hole 119 and rest on the reduced pin portions 122 and 123 respectively for locking or releasing the pulling bar 116. A coil spring 127 in the enlarged hole 118 bears against a shoulder on the pin 121 and against a cap 128 threaded on the end of the bar 116 so as to normally urge the pin 121 inwardly of said hole 118 to hold the middle reduced pin portion 122 against the balls 126 and thereby hold the balls 126 projecting outwardly from the sockets 124 and abutting against the adjacent end of the bushing 117, so as positively to lock the bar 116 against movement relatively to the bushing 117.

The end of the pulling pin 121 slidably extends through the cap 118. A tubular sleeve 129 is threaded on the extended end of the pulling pin 121 so as to leave comparatively long space between the extended end of the pin 121 and the closed end 131 of the sleeve 129. The actuating line 86 extends through the closed end 131 of the sleeve 129. A ball 132 secured to the end of the actuating line 86 is movable in the space 133 between the threaded end of the pin 121 and the closed end 131 of the sleeve 129. The actuating line 86 is guided and connected to the manipulating device 98 in the manner described in the first embodiment herein.

In the initial assembly position the actuating line 86 is so assembled that the ball 132 thereon is near the threaded end of the pin 121 so that initial manipulation or pulling of the line 86 to a limited extent will not release the locking device. In this manner accidental play or displacement of the line 86 will be inoperative with respect to the valve device. When the manipulating device 98 is operated so that complete operating pull is exerted, then the ball 132 is pulled against the closed end 131 of the sleeve 129 and pulls the sleeve 129 which latter in turn pulls the threaded pin 121 against the action of the spring 127 until the middle reduced portion 122 of the pin clears the balls 126. Thereupon the balls 126 are allowed to drop inwardly against the reduced end portion 122 of the pin 121, and thus the balls 126 can be drawn into the bushing 117. After the coil spring 127 is compressed the pull is exerted on the bar 116. As the bar 116 is pulled the lever 107 is turned around its pivot 108 in a clockwise direction, viewing FIG. 11, so as to move the abutment end 61 thereof together with the abutment screw 63 away from the wedge cam device 26 and simultaneously to pull the pull line 36 for turning the wedge cam 26 to the valve releasing position thereby to permit the automatic opening of the valve and the escape of the gas from the bottle 8 into the inflatable raft 4. Inasmuch as the actuating line 86 is operated simultaneously with the other release mechanisms as described in my said copending application, the inflation of the raft 4 is positively prevented until the survival kit is actually released, consequently all accidental inflation of the raft prior to the release of the survival kit is positively prevented.

I claim:

1. In a safety support and locking device for inflating means for a raft in an aerial survival kit, including a bottle carried by the raft and a valve on the bottle connected to the raft,
   (a) a rigid support secured in the kit forming a bed for said bottle,
   (b) side members on said support to prevent transverse movement of the bottle,
   (c) an end member engaging the bottom of the bottle to limit longitudinal movement in one direction,
   (d) a turnable valve opening device on the valve of said bottle operable by generally lineal pull thereon in a direction away from said bottom,
   (e) an abutment device bearing against said turnable device to prevent longitudinal movement of the valve and the bottle on said support in the other direction and hold said bottle against said end member,
   (f) releasable locking means to lock said abutment device in abutting relation to said turnable device,
   (g) means coacting with said abutment device and engaging said turnable device to turn said turnable device when said abutment device is moved out of said abutting position,
   (h) actuating means to release said releasable means and move said abutment device from said abutting position thereby to pull said coacting means to turn said valve opening device for opening said valve,
   (i) said coacting means being releasable from its engagement with said turnable valve opening device after said valve opening device is turned and the valve is opened.

2. In an aerial survival kit, the combination with
   (a) a rigid case,
   (b) a rigid lid for the case,
   (c) releasable means to hold the lid on the case,
   (d) manipulable means including actuating lines to release said releasable means at will to separate the lid from the case, (e) an inflatable raft packed in the case being adapted to be freed from the case after said lid is separated from the case,
(f) a container for inflating medium connected to said raft so as to be freed from said case with the raft,
(g) a valve on the container to control flow of said inflating medium from said container into said raft,
(h) of means for preventing inflation of said raft until the lid is released, comprising
(i) a support to nest said container inside and along a wall of said case,
(j) means to hold the valve closed,
(k) restraining means to restrain said valve holding means against movement for the opening of said valve,
(l) means associated with said restraining means to move said valve holding means to valve opening position when said restraining means is moved away from said valve holding means,
(m) a lever pivoted on said support and supporting said restraining means in restraining position,
(n) a locking block pivoted on said lever between the pivot of the lever and said restraining means,
(o) an actuating line connected to said locking block and to said manipulable means to transmit manipulating pull for turning said locking block about its pivot,
(p) an arm extended from said locking block,
(q) a keeper element held on said support at an incline substantially tangential to a circle centered on the axis of the pivot of the locking block, said arm abutting against said keeper element so as to prevent turning of said lever about the lever pivot but being movable along and off said element upon the turning of said block about said block pivot,
(r) coacting means on said lever and on said block to interlock said block and said lever after said arm is freed from said keeper element thereby to transmit the pull of said actuating line for turning said lever for moving said restraining means from said restraining position and thereby to actuate said associated means to move said valve holding means into valve opening position.

3. In an aerial survival kit, the combination with
(a) a rigid case,
(b) a rigid lid for the case,
(c) releasable means to hold the lid on the case,
(d) manipulable means including actuating lines to release said releasable means at will to separate the lid from the case,
(e) an inflatable raft packed in the case being adapated to be freed from the case after said lid is separated from the case,
(f) a container for inflating medium connected to said raft so as to be freed from said case with the raft,
(g) a valve on the container to control flow of said inflating medium from said container into said raft,
(h) of means for preventing inflation of said raft until the lid is released, comprising
(i) a support to nest said container inside and along a wall of said case,
(j) means to hold the valve closed,
(k) restraining means to restrain said valve holding means against movement for the opening of said valve,
(l) means associated with said restraining means to move said valve holding means to valve opening position when said restraining means is moved away from said valve holding means,
(m) a lever pivoted on said support and supporting said restraining means in restraining position,
(n) a locking block pivoted on said lever between the pivot of the lever and said restraining means,
(o) an actuating line connected to said locking block and to said manipulable means to transmit manipulating pull for turning said locking block abouts its pivot,
(p) an arm extended from said locking block,
(q) a keeper element held on said support at an incline substantially tangential to a circle centered on the axis of the pivot of the locking block, said arm abutting against said keeper element so as to prevent turning of said lever about the lever pivot but being movable along and off said element upon the turning of said block about said block pivot,
(r) coacting means on said lever and on said block to interlock said block and said lever after said arm is freed from said keeper element thereby to transmit the pull of said actuating line for turning said lever for moving said restraining means from said restraining position and thereby to actuate said associated means to move said valve holding means into valve opening position,
(s) spring means normally to urge said block into abutting relation to said lever for holding said lever in restraining position when said arm is abutting said keeper element.

4. In an aerial survival kit, the combination with
(a) a rigid case,
(b) a rigid lid for the case,
(c) releasable means to hold the lid on the case,
(d) manipulable means including actuating lines to release said releasable means at will to separate the lid from the case,
(e) an inflatable raft packed in the case being adapted to be freed from the case after said lid is separated from the case,
(f) a container for inflating medium connected to said raft so as to be freed from said case with the raft,
(g) a valve on the container to control flow of said inflating medium from said container into said raft,
(h) of means for preventing inflation of said raft until the lid is released, comprising
(i) a support to nest said container inside and along a wall of said case,
(j) means to hold the valve closed,
(k) restraining means to restrain said valve holding means against movement for the opening of said valve,
(l) means associated with said restraining means to move said valve holding means to valve opening position when said restraining means is moved away from said valve holding means,
(m) a lever, said restraining means being carried on one end of said lever,
(n) means to pivot said lever on said support spaced from the ends of said lever,
(o) a pulling element connected to the other end of said lever to turn said lever and said restraining means out of restraining position,
(p) a relatively stationary guide for said pulling element,
(q) releasable locking members on said pulling element abutting said guide to prevent pulling movement of said pulling element,
(r) an actuating line connected to said manipulable means,
(s) releasing means connected to said actuating line and to said pulling element so as to release said locking members from said guide when pulled by said actuating line and then to transmit such pull to said pulling element for turning said lever out of said restraining position and thereby to actuate said associated means to move said valve holding means into valve opening position.

5. Means for preventing accidental inflation of a raft in an aerial survival kit, said raft carrying an inflating medium container and a valve connecting said container to said raft, comprising (a) a support for holding the container in fixed position in the kit,
(b) releasable valve holding means related to the container to hold said valve closed,
(c) a lever pivoted on said support in operative relation to said valve holding means,
(d) restraining means on said lever engageable with the valve holding means to restrain said valve holding means against movement from said valve closing position and to hold said container in fixed position,
(e) means on said lever coacting with said valve holding means to move said valve holding means into valve opening position when said lever moves said restraining means away from said valve holding means,
(f) an actuating line for actuating said lever for moving said restraining means away from said valve holding means,
(g) locking means interconnected between said actuating line and said lever to lock the lever in valve closing position, said locking means being releasable by said actuating line so as to transmit pull of said actuating line for actuating said lever,
(h) a locking block pivoted on said lever,
(i) a keeper member held fixedly relatively to said block,
(j) a keeper surface on said keeper member being generally tangential to a circle centered on the pivot axis of said block, the radius from the block pivot axis to said surface being shorter than the radius from the lever pivot axis to said surface,
(k) an element on said block contacting said keeper surface and moving on a circular path of said shorter radius when said block is turned about its pivot, but locking against said surface when the lever is turned about the lever pivot, thereby to release said lever only after the block has been turned to free said element from said surface,
(l) said actuating line being anchored to said block, with freedom of limited play, for turning said block about the block pivot,
(m) and interlocking means between said block and said lever to predetermine the arc of movement of said block relatively to said lever and to interlock said block and lever after said element is freed for turning said lever.

6. The means defined in claim 5, and
(n) resiliently yieldable means normally to urge said locking block into an initial locking position.

7. The means defined in claim 5, and
(n) means to adjust said interlocking means for adjusting the limits of the arc of block movement.

8. The means defined in claim 5, said restraining means including
(n) a stem adjustably secured in an end of said lever so as to be generally tangential to the arc of movement of said lever
(o) a head on said stem interfitting with said valve holding means in the restraining position of said lever.

9. Means for preventing accidental inflation of a raft in an aerial kit having an inflating medium container supported in the kit and connected to the raft to be freed therewith, and a valve on the container controlling communication between the container and the raft, including
(a) a valve stem on said valve
(b) valve holding means engaging the valve stem to hold the valve closed being movable so as to move said valve stem into valve opening position
(c) a lever pivoted in operative relation to said valve holding means
(d) a restraining element on said lever engageable with said valve holding means to restrain said valve holding means against movement into valve opening position
(e) a locking block pivoted on said lever between said restraining element and the pivot of said lever
(f) a relatively fixed keeper member
(g) a locking element on said block engaging said keeper member
(h) said keeper member being tangential to the arc of movement of said locking element on said block about the block pivot so as to permit said locking element and said block to be freed from said keeper member when said block is turned away from said valve holding means about the block pivot, but to interlock with said locking element to resist turning about the lever pivot prior to freeing said member and block,
(i) an actuating line connected to said block unlock said block at will
(j) and releasable means of connection between said lever and said valve holder means to move said valve holder means into valve opening position when said lever is turned away from said valve holder means, said means of connection being released after the opening of said valve to permit freeing of said container with the raft.

10. The means defined in claim 9, and
(k) resiliently yieldable means normally to urge said block into locking position on said lever.

11. Means for preventing accidental inflation of a raft in an aerial kit having an inflating medium container supported in the kit and connected to the raft to be freed therewith, and a valve on the container controlling communication between the container and the raft, including
(a) a valve stem on said valve
(b) valve holding means engaging the valve stem to hold the valve closed being movable so as to move said valve stem into valve opening position
(c) a lever pivoted in operative relation to said valve holding means
(d) a restraining element on said lever engageable with said valve holding means to restrain said valve holding means against movement into valve opening position
(e) a pulling stem pivotally secured to the other end of the lever on the other side of the lever pivot
(f) a fixed guide bushing in the kit for said pulling stem slidably guiding the pulling stem
(g) a plurality of locking balls movable radially into and out of said pulling stem, and abutting said bushing to lock said pulling stem against movement
(h) a reciprocable element in said pulling stem engageable with said balls for holding the ball in outwardly projecting locking position
(i) resiliently yieldable means to urge said reciprocable element into locking engagement with said balls
(j) a manipulable actuating line connected to said reciprocable element to exert pull on said reciprocable element for releasing said balls thereby to release said pulling stem, said reciprocable element transmitting such pull to said pulling stem for turning said lever for releasing said valve holding means
(k) and a releasable pulling element extended from said lever to said valve holder means to pull said valve holder means into valve opening position when said lever is turned away from said valve holder means.

12. Means for locking a pivoted lever against movement in a direction comprising
(a) a locking block pivoted on the lever
(b) a keeper member held tangentially to a circle about the pivot of the locking block
(c) a locking element extended from said block to ride on said keeper member
(d) said keeper member being on an incline spaced from the side of the lever in the direction in which the lever turning is to be inhibited (e) the radical distance of said keeper member from the pivot of said block being shorter than the radical distance from the lever pivot so as to resist lever movement until after the block is turned to free said locking element from said keeper (f) means to transmit turning moment to said block (g) means to interlock said block and lever after a predetermined arc of turning of said block thereby to transmit turning force to said lever.

References Cited by the Examiner

UNITED STATES PATENTS

| | | | |
|---|---|---|---|
| 1,861,784 | 6/32 | Brown et al. | 244—138 |
| 2,095,974 | 10/37 | Finch | 9—11 |
| 2,235,308 | 3/41 | Banker | 251—89 X |
| 2,467,037 | 4/49 | Kajdan | 9—11 X |
| 2,949,274 | 8/60 | Heiges et al. | 251—74 |

FERGUS S. MIDDLETON, *Primary Examiner.*

UNITED STATES PATENT OFFICE

CERTIFICATE OF CORRECTION

Patent No. 3,165,763　　　　　　　　　　　　　　January 19, 1965

John A. Gaylord

It is hereby certified that error appears in the above numbered patent requiring correction and that the said Letters Patent should read as corrected below.

Column 11, lines 3 and 4, for "radical", each occurrence, read -- radial --.

Signed and sealed this 6th day of July 1965.

(SEAL)
Attest:

ERNEST W. SWIDER　　　　　　　　　　　　　　EDWARD J. BRENNER
Attesting Officer　　　　　　　　　　　　　　Commissioner of Patents